(12) United States Patent
Li et al.

(10) Patent No.: US 12,420,877 B2
(45) Date of Patent: Sep. 23, 2025

(54) MACHINE CAPABLE OF MOVING ON INCLINED PLANE AND USE METHOD THEREFOR

(71) Applicants: Zhejiang University, Zhejiang (CN); HANGZHOU FUYA SCIENCE AND TECHNOLOGY CO., LTD., Hangzhou (CN)

(72) Inventors: Xin Li, Zhejiang (CN); Jianghong Zhao, Zhejiang (CN); Jie Qin, Zhejiang (CN)

(73) Assignees: ZHEJIANG UNIVERSITY, Zhejiang (CN); HANGZHOU FUYA SCIENCE AND TECHNOLOGY CO., LTD., Hangzhou (CN)

( * ) Notice: Subject to any disclaimer, the term of this patent is extended or adjusted under 35 U.S.C. 154(b) by 1036 days.

(21) Appl. No.: 17/448,676

(22) Filed: Sep. 23, 2021

(65) Prior Publication Data
US 2022/0094301 A1    Mar. 24, 2022

(30) Foreign Application Priority Data
Sep. 23, 2020 (CN) .......................... 202011006700.3

(51) Int. Cl.
*B62D 57/024*    (2006.01)
(52) U.S. Cl.
CPC .................. *B62D 57/024* (2013.01)
(58) Field of Classification Search
CPC .................................................. B62D 57/024
See application file for complete search history.

(56) References Cited

U.S. PATENT DOCUMENTS

| | | | | |
|---|---|---|---|---|
| 3,776,515 A | * | 12/1973 | Bergeron | B66D 3/02 180/7.5 |
| 5,553,548 A | * | 9/1996 | Eaton | A61G 5/061 105/72.2 |
| 6,095,284 A | * | 8/2000 | Smith | E06C 1/34 182/103 |

(Continued)

FOREIGN PATENT DOCUMENTS

| | | | | |
|---|---|---|---|---|
| CN | 106926253 A | * | 7/2017 | ............. A47L 11/38 |
| CN | 109420629 A | | 3/2019 | |
| CN | 109773800 A | | 5/2019 | |

(Continued)

*Primary Examiner* — Kevin Hurley
(74) *Attorney, Agent, or Firm* — McCoy Russell LLP

(57) ABSTRACT

The present disclosure relates to a machine capable of moving on an inclined plane, including a first split body, a second split body and functional components, where the functional components include a moving mechanism, a flexible connecting device and operating tools, the operating tools are installed on the first split body and/or the second split body, and configured to perform operations, the flexible connecting device connects the first split body to the second split body, and adjusts a distance between the first split body and the second split body, the moving mechanism is installed on the first split body and/or the second split body and configured to drive the first split body and/or the second split body to move on the inclined plane, the first split body contains a suspension mechanism, and the suspension mechanism is configured to connect or disconnect the inclined plane.

10 Claims, 8 Drawing Sheets

(56) References Cited

U.S. PATENT DOCUMENTS 6,360,833 B1 * 3/2002 Valencia ................ A61G 5/066
                         280/5.24
11,878,751 B2 * 1/2024 Li ............................. B25J 5/00

FOREIGN PATENT DOCUMENTS

| | | | | |
|---|---|---|---|---|
| CN | 110667719 A | | 1/2020 | |
| CN | 110920875 A | | 3/2020 | |
| CN | 111619690 A | | 9/2020 | |
| CN | 111216819 B | * | 12/2023 | ............. B25J 11/00 |
| KR | 20160036688 A | * | 4/2016 | |

\* cited by examiner

MACHINE CAPABLE OF MOVING ON INCLINED PLANE AND USE METHOD THEREFOR

CROSS REFERENCE TO RELATED APPLICATIONS

The present application claims priority to Chinese Patent Application No. 202011006700.3 filed on Sep. 23, 2020. The entire contents of the above-listed application is hereby incorporated by reference for all purposes.

TECHNICAL FIELD

The present disclosure relates to the technical field of adsorption technology application, and to a machine capable of moving on an inclined plane and a use method therefor.

BACKGROUND

It is required to implement some specific operations on some inclined planes, such as surface crack detection on an outer wall of a building and cleaning of an inclined photovoltaic panel array. With the increase in labor costs, machines have gradually replaced workers to complete these dangerous operations.

Wall climbing machines are usually provided with surface attachment devices. Adhesion of the surface attachment devices is implemented by using a magnetic force technology (described in the patent No. CN201910983947.1), a rotor counter-thrust technology (described in the patent No. CN201911117754.4), a negative pressure adsorption technology (described in the patent No. CN201910807463.1) or the like, so that the wall climbing machines can be attached to an inclined or vertical surface for movement, and carry operating tools (such as a camera, a flaw detection instrument and a cleaning tool) to perform operations. The existing wall climbing machines have the following disadvantages:

(1) The surface attachment device is a core component of the wall climbing machine. The surface attachment device must always be in an operating state to produce stable adhesion. Otherwise, the wall climbing machine will fall.

(2) The surface attachment device that has always been in the operating state consumes a lot of energy. Even if the wall climbing machine stops on a working surface, the surface attachment device must always operate. This will obviously greatly shorten endurance of a battery when the wall climbing machine is powered using the battery.

(3) The failure rate will increase greatly if the surface attachment device operates for a long time. For example, a surface attachment device in a negative pressure adsorption mode easily sucks in dust or foreign matter from the outside when operating. Sucking in dust and foreign matter for a long time will cause damage to a vacuum pump and blockage of a vacuum pipeline. For another example, when a surface attachment device in an electromagnet adsorption mode operates, an electromagnet adsorbs magnetic dust (such as iron rust and scrap iron), and the accumulation of magnetic dust on the magnet to a certain extent will weaken the magnetic force. Therefore, the long-time operation of the surface attachment device will increase the probability of falling of the wall climbing machine.

(4) The failure rate will increase greatly if a surface attachment device moves in a wide range on an inclined surface. For example, a surface attachment device in a negative pressure adsorption mode sucks in dust or foreign matter on the inclined surface when operating. Obviously, a larger moving range of the surface adsorption device indicates more dust and foreign matter sucked in, and more ease of causing damage to the vacuum pump and blockage of the vacuum pipeline. For another example, a surface attachment device in an electromagnet adsorption mode adsorbs magnetic dust (such as iron rust and scrap iron) when operating, and the accumulation of magnetic dust on the magnet to a certain extent will weaken the magnetic force. Obviously, a larger moving range of the surface adsorption device indicates more magnetic dust accumulated on the surface attachment device. Therefore, the large-range movement of the surface attachment device on the inclined surface will increase the probability of falling of the wall climbing machine.

SUMMARY

In view of the technical problems to be solved by the present disclosure, a machine capable of moving on an inclined plane that enables a surface attachment device to operate intermittently and move in a small range and a use method therefor are provided, where the machine has a simple structure and is convenient to use.

The present disclosure is implemented in this way: A machine capable of moving on an inclined plane is provided, including a first split body, a second split body and functional components, where the functional components include a moving mechanism, a flexible connecting device and operating tools, the operating tools are installed on the first split body and/or the second split body, and configured to perform operations, the flexible connecting device connects the first split body to the second split body, and adjusts a distance between the first split body and the second split body, the moving mechanism is installed on the first split body and/or the second split body and configured to drive the first split body and/or the second split body to move on the inclined plane, the first split body contains a suspension mechanism, and the suspension mechanism is configured to connect or disconnect the inclined plane.

In the present disclosure, an included angle between the surface referred to by the inclined plane and the horizontal plane may be an obtuse angle, a right angle or an acute angle.

Further, the machine capable of moving on an inclined plane includes a split connection mechanism installed on the first split body and/or the second split body and configured to connect and disconnect the first split body and the second split body.

Further, the flexible connecting device includes a rope and a rope winding mechanism for winding or unwinding the rope, and a rope driving mechanism changes the distance between the first split body and the second split body and tensions or relaxes the rope.

Further, the rope driving mechanism includes the rope winding mechanism, and the rope winding mechanism changes a length of the rope between the first split body and the second split body by winding the rope, and tensions or relaxes the rope.

Further, the rope driving mechanism includes a rope climbing mechanism, and the rope climbing mechanism is arranged on the second split body and drives the second split body to move along the rope.

Further, the functional components include a surface attachment device, and the surface attachment device is installed on the first split body and/or the second split body and configured to be attached to the inclined plane.

The present disclosure is implemented in this way: A use method for the machine capable of moving on an inclined plane described above is further provided, including the following steps:
- step i-1: enabling the first split body and/or the second split body and the functional components installed on the first split body and/or the second split body to move on the inclined plane;
- step i-2: connecting a suspension mechanism of the first split body to the inclined plane after the first split body moves to a designated position of the inclined plane;
- step i-3: adjusting a distance between the first split body and the second split body through a flexible connecting device, enabling the second split body and the functional components installed on the second split body to move on the inclined plane, and meanwhile, enabling operating tools to perform operations on the inclined plane;
- step i-4: separating the suspension mechanism of the first split body from the inclined plane after this round of operations is completed;
- step i-5: repeating steps i-2 to i-4 to continue a next round of operations; and
- step i-6: enabling the first split body and/or the second split body and the functional components installed on the first split body and/or the second split body to move to below the inclined plane, and ending the operations of a machine capable of moving on an inclined plane on the inclined plane.

The present disclosure is implemented in this way: A use method for the machine capable of moving on an inclined plane described above is further provided, including the following steps:
- step ii-1: carrying, by a worker, the machine capable of moving on an inclined plane to the inclined plane for operation;
- step ii-2: connecting a suspension mechanism of a first split body to the inclined plane with the assistance of the worker;
- step i-3: adjusting a distance between the first split body and the second split body through a flexible connecting device, enabling the second split body to move on the inclined plane, and meanwhile, enabling operating tools to perform operations on the inclined plane;
- step ii-4: after this round of operations is completed, separating the suspension mechanism of the first split body from the inclined plane with the assistance of the worker, and removing the machine capable of moving on an inclined plane from the inclined plane; and
- step ii-5: carrying, by the worker, the machine capable of moving on an inclined plane to another inclined plane for operation, repeating steps ii-2 to ii-4, and performing a next round of operations until the operations on all inclined planes are completed.

The present disclosure is implemented in this way: A use method for the machine capable of moving on an inclined plane described above is further provided, including the following steps:
- step iii-1: combining a first split body and a second split body into a whole, and enabling the first split body and the second split body and the functional components installed on the first split body and the second split body to move on the inclined plane;
- step iii-2: enabling the first split body and the second split body and the functional components installed on the first split body and the second split body to move to a designated position of the inclined plane, and connecting a suspension mechanism of the first split body to the inclined plane;
- step iii-3: separating the second split body from the first split body, adjusting a distance between the first split body and the second split body through a flexible connecting device, enabling the second split body and the functional components installed on the second split body to move on the inclined plane, and meanwhile, enabling operating tools to perform operations on the inclined plane;
- step iii-4: after this round of operations is completed, combining the first split body and the second split body into a whole, separating the suspension mechanism from the inclined plane, and enabling the first split body and/or the second split body and the functional components installed on the first split body and/or the second split body to move on the inclined plane;
- step iii-5: repeating steps iii-2 to iii-4 to continue a next round of operations; and
- step iii-6: enabling the first split body and/or the second split body and the functional components installed on the first split body and/or the second split body to move to below the inclined plane, and ending the operations of a machine capable of moving on an inclined plane on the inclined plane.

The present disclosure is implemented in this way: A use method for the machine capable of moving on an inclined plane described above is further provided, including the following steps:
- step iv-1: enabling a first split body and components installed on the first split body to move on the inclined plane, a second split body and function components installed on the second split body being positioned below the inclined plane;
- step iv-2: moving the first split body to a designated position of the inclined plane, and connecting a suspension mechanism of the first split body to the inclined plane;
- step iv-3: adjusting a distance between the second split body and the first split body through a flexible connecting device, enabling the second split body and the functional components installed on the second split body to move on the inclined plane, and meanwhile, enabling operating tools to perform operations on the inclined plane;
- step iv-4: when this round of operations is completed, enabling the second split body and the functional components installed on the second split body to move to below the inclined plane, the flexible connecting device being in a relaxed state without tension; separating the suspension mechanism of the first split body from the inclined plane, and then enabling the first split body and the functional components installed on the first split body to move on the inclined plane;
- step iv-5: repeating steps iv-2 to iv-4 to continue a next round of operations; and
- step i-6: enabling the first split body and the functional components installed on the first split body to move to below the inclined plane, and ending the operations of a machine capable of moving on an inclined plane on the inclined plane.

The present disclosure is implemented in this way: A multi-robot system is further provided, including the machine capable of moving on an inclined plane described above, and further including a carrying machine, where the carrying machine includes a mobile machine body and a machine docking mechanism, the mobile machine body is capable of moving in space, the machine docking mechanism is installed on the mobile machine body, and the machine capable of moving on an inclined plane and the carrying machine are capable of being combined or separated by the machine docking mechanism.

Further, the mobile machine body is a flying machine that flies in the air, or a vehicle body that moves on the ground, or a hull that floats in water.

Further, the machine docking mechanism includes a bridge plate and a bridge plate adjustment mechanism, the bridge plate is installed on the bridge plate adjustment mechanism, and the bridge plate adjustment mechanism is installed on the mobile machine body; the bridge plate adjustment mechanism adjusts a position and posture of the bridge plate, and the machine capable of moving on an inclined plane moves from the inclined plane to the bridge plate and is combined with the carrying machine, or the machine capable of moving on an inclined plane moves from the bridge plate to the inclined plane and is separated from the carrying machine.

The present disclosure is implemented in this way: A use method for the multi-robot system described above is further provided, including the following steps:

step v-1: combining a machine capable of moving on an inclined plane with a carrying machine through a machine docking mechanism, and using the carrying machine to convey the machine capable of moving on an inclined plane to the inclined plane for operation;

step v-2: separating the machine capable of moving on an inclined plane from the carrying machine through the machine docking mechanism, and moving the machine capable of moving on an inclined plane on the inclined plane;

step v-3: connecting a suspension mechanism of a first split body to the inclined plane after the first split body moves to one designated position of the inclined plane;

step v-4: adjusting a distance between the first split body and a second split body through a flexible connecting device, enabling the second split body and the functional components installed on the second split body to move on the inclined plane, and meanwhile, enabling operating tools to perform operations;

step v-5: after this round of operations is completed, starting part or all of a surface attachment device and a moving mechanism, separating the suspension mechanism of the first split body from the inclined plane, and moving the machine capable of moving on an inclined plane on the inclined plane; and step v-6: repeating steps v-3 to v-5 to implement the next round of operations at different positions of the inclined plane, or combining the machine capable of moving on an inclined plane with the carrying machine through the machine docking mechanism, using the carrying machine to convey the machine capable of moving on an inclined plane to another inclined plane, repeating steps v-2 to v-5, and implementing the next round of operations on another inclined plane until the operations on all inclined planes are completed.

Compared with the prior art, the machine capable of moving on an inclined plane and the use method therefor according to the present disclosure feature the following:

(1) A relationship of reliable fixed connection is formed between the suspension mechanism and the inclined plane. Even if the machine capable of moving on an inclined plane fails (such as a failure of the surface attachment device, a failure of the moving mechanism, a failure of a control program and a failure of operating tools), the machine capable of moving on an inclined plane can still be safely hung on the inclined plane without falling.

(2) In the case of mutual connection between the suspension mechanism and the inclined plane, the flexible connecting device can balance the gravity of the second split body and the functional components installed on the second split body. Therefore, the surface attachment device no longer needs to generate a huge adsorption force to balance the gravity. During the operation implemented by the machine capable of moving on an inclined plane, the surface attachment device may be in a stopped operation state or a low-power operation state, which greatly reduces energy consumption.

(3) As described in (2) above, the surface attachment device may be in a stopped operation state, which shortens the working time. Therefore, the probability of failure of the surface attachment device is greatly reduced and the service life is greatly prolonged.

(4) The machine capable of moving on an inclined plane can climb to the inclined plane to complete the placement and recovery of the suspension mechanism. An operator only needs to operate the machine on the ground. The operator does not need to climb on the inclined plane to perform any operation, which completely eliminates the operator's high-altitude operation risk, and at the same time greatly reduces the worker's work intensity and difficulty.

BRIEF DESCRIPTION OF DRAWINGS

FIG. 1 is a schematic diagram of a state in which the machine capable of moving on an inclined plane (after a first split body and a second split body are combined) is adsorbed on the inclined plane and moves. FIG. 2 is a schematic diagram of a state in which a hook of a suspension mechanism of the machine capable of moving on an inclined plane is hung on an upper edge of the inclined plane, and the first split body and the second split body are separated from each other.

FIG. 3 is a schematic diagram of a state in which a first split body of the machine capable of moving on an inclined plane is adsorbed on the inclined plane and moves, and a second split body is on the horizontal surface below the inclined plane. FIG. 4 is a schematic diagram of a state in which a hook of a suspension mechanism of the machine capable of moving on an inclined plane is hung on an upper edge of the inclined plane, and the first split body and the second split body are located on the inclined plane.

FIG. 5 is a schematic diagram of a state in which the machine capable of moving on an inclined plane is adsorbed on an inclined plane of a photovoltaic module. FIG. 6 is a schematic diagram of tensioning of a rope by adding a rope pulley in FIG. 5.

FIG. 7 is a schematic diagram of a state in which the machine capable of moving on an inclined plane operates on an inclined plane of a photovoltaic module, where a rope winding mechanism is arranged on a plane below the inclined plane.

FIG. 8 is a schematic diagram of a state in which the machine capable of moving on an inclined plane (after a first split body and a second split body are combined) is located at a corresponding position of an inclined plane of a photovoltaic module and moves. FIG. 9 is a schematic diagram of a state in which a hook of a suspension mechanism of the machine capable of moving on an inclined plane is hung on an upper edge of the inclined plane of the photovoltaic module, and the first split body and the second split body are combined with each other. FIG. 10 is a schematic diagram of a state in which a hook of a suspension mechanism of the machine capable of moving on an inclined plane is hung on an upper edge of the inclined plane of the photovoltaic module, and the first split body and the second split body are separated from each other.

FIG. 11 is a schematic diagram of a state in which a second split body of the machine capable of moving on an inclined plane is located on the ground below an inclined plane of a photovoltaic module, and a worker uses a long rod to hang a hook of a suspension mechanism at an upper edge of the inclined plane of the photovoltaic module. FIG. 12 is a schematic diagram of a state in which a first split body and a second split body of the machine capable of moving on an inclined plane are combined together, and a worker uses a long rod to push the second split body to hang a hook of a suspension mechanism at an upper edge of the inclined plane of the photovoltaic module.

FIG. 13 is a schematic diagram showing that a carrying machine moves the machine capable of moving on an inclined plane to an inclined plane of a photovoltaic module, and the machine capable of moving on an inclined plane is ready to move from a bridge plate to the inclined plane. FIG. 14 is a schematic diagram showing that the machine capable of moving on an inclined plane that is located on the inclined plane of the photovoltaic module is ready to move from the inclined plane to the bridge plate.

DETAILED DESCRIPTION

To make the technical problems to be solved, technical solutions and beneficial effects of the present disclosure clearer, the following further describes the present disclosure in detail with reference to the accompanying drawings and embodiments. It should be understood that the specific embodiments described herein are merely used to explain the present disclosure, but not intended to limit the present disclosure.

Embodiment 1

Figure 1:
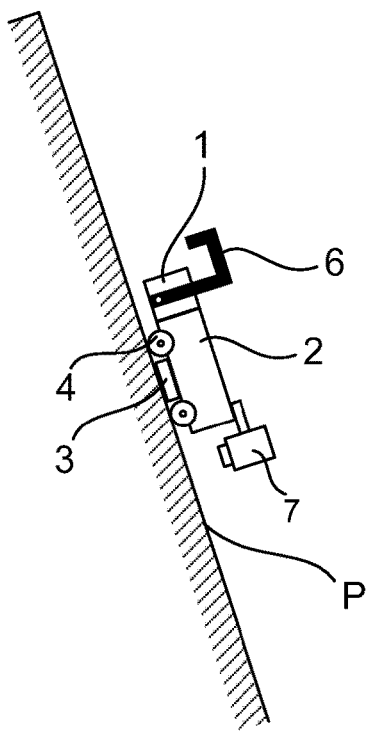
FIG. 1 and FIG. 2 are schematic plan views of a structural principle of Embodiment 1 of a machine capable of moving on an inclined plane according to the present disclosure.
Figure 2:
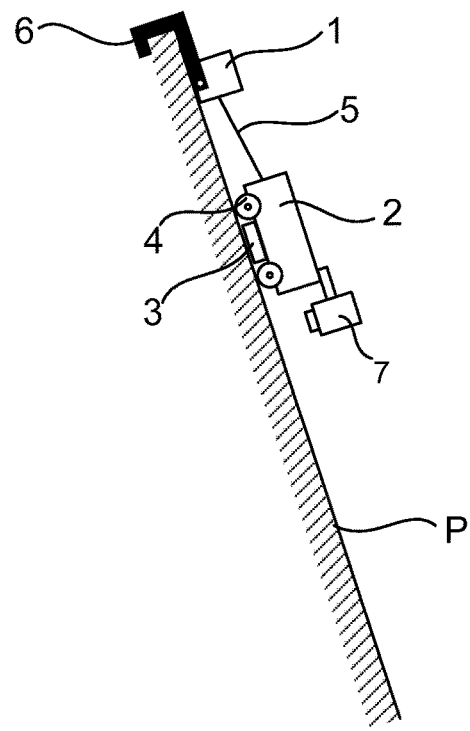

Referring to FIG. 1 and FIG. 2 at the same time, Embodiment 1 of a structure of the machine capable of moving on an inclined plane and a use method therefor according to the present disclosure is provided.

The machine capable of moving on an inclined plane according to the present disclosure includes a first split body 1, a second split body 2 and functional components. The functional components include a surface attachment device 3, a moving mechanism 4, a flexible connecting device and operating tools 7. The flexible connecting device includes a rope 5 and a rope driving mechanism. The rope driving mechanism in this embodiment is a rope winding mechanism (not shown) for winding or unwinding the rope 5. The first split body 1 is provided with a suspension mechanism. The suspension mechanism of this embodiment includes a rotating hook 6, and the hook 6 hooks an upper edge of an inclined plane P and forms a connection relationship with the inclined plane P.

The operating tools 7 installed on the second split body 2 are configured to perform operations on the inclined plane. The surface attachment device 3 is installed on the second split body 2 and configured to be attached to the inclined plane P. The moving mechanism 4 is installed on the second split body 2. The moving mechanism 4 of this embodiment is a plurality of driving wheels mounted on the second split body 2.

In the present disclosure, the up-and-down movement of the moving mechanism 4 is defined as longitudinal movement, and the movement parallel to the ground (for example, left-and-right movement or front-and-rear movement on an inclined plane) is defined as horizontal movement.

The first split body 1 and the second split body 2 are connected to each other through the flexible connecting device. The rope winding mechanism is installed on the second split body. One end of the rope 5 is connected to the first split body, and the other end of the rope 5 is connected to the rope winding mechanism. The rope winding mechanism changes a distance between the first split body 1 and the second split body 2 and tensions or relaxes the rope by winding or unwinding the rope.

The present disclosure further discloses a use method for the machine capable of moving on an inclined plane described above, including the following steps.

Step 11: Combine a first split body 1 and a second split body 2 into a whole through the tightening action of a flexible connecting device, and start a surface attachment device 3 and a moving mechanism 4 that are installed on the second split body. The surface attachment device 3 provides an adsorption force for adsorbing the inclined plane P, the adsorption force causes the moving mechanism 4 to generate friction with the inclined plane P, and the friction overcomes gravity and drives the first split body 1, the second split body 2 and the functional components installed on the first split body 1 and the second split body 2 to move on the inclined plane P.

Step 12: After the first split body 1, the second split body 2 and the functional components installed on the first split body 1 and the second split body 2 move to a designated position of the inclined plane P (a position that facilitates the hooking of the hook 6 of the suspension mechanism, such as a protrusion, a step, a shackle and an edge on the inclined plane P, and in this embodiment, the designated position is an upper edge of the inclined plane P), enable the hook 6 of the suspension mechanism to rotate and hook the upper edge of the inclined plane P, so that the hook 6 and the inclined plane P form a connection relationship.

Step 13: A rope winding mechanism unwinds a rope, so that the second split body 2 is separated from the first split body 1. The second split body 2 longitudinally moves on the inclined plane P by the extension and shortening of the rope 5. The rope 5 is in a tensioned state, and the tension of the rope 5 acts on the second split body 2 to balance the gravity of the second split body 2 and the functional components installed on the second split body 2. In this case, if the adsorption force of the surface attachment device 3 is reduced or even the surface attachment device 3 is completely shut down, the machine capable of moving on an inclined plane can be safely hung on the inclined plane P without falling. In this embodiment, the operating tool 7 is a camera for photographing a surface state of the inclined plane. No operation reaction force is generated during the operation of the camera, so that the surface attachment device 3 can be completely shut down to reduce energy consumption and protect the surface attachment device 3. To ensure the stability of the photographing process, the surface attachment device 3 may also be started to generate a small adhesion, which can prevent the second split body 2 from shaking when moving on the inclined plane P.

Step 14: After this round of operations is completed, tighten the rope 5 by the rope winding mechanism, so that the first split body 1 and the second split body 2 are combined into a whole; start the surface attachment device 3 and the moving mechanism 4, and then enable the hook 6 to rotate and be separated from the upper edge of the inclined plane P; and the surface attachment device 3 and the moving mechanism 4 drive the first split body 1 and the second split body 2 and the functional components installed on the first split body 1 and the second split body 2 to move on the inclined plane P.

Step 15: Repeat steps 12 to 14 to continue a next round of operations.

Step 16: Enable the first split body 1 and the second split body 2 and the functional components installed on the first split body 1 and the second split body 2 to move to below the inclined plane P, and end the operations of a machine capable of moving on an inclined plane on the inclined plane P.

In this embodiment, the flexible connecting device connects the first split body 1 to the second split body 2 by using the flexible rope 5 and the rope winding mechanism. Compared with the conventional mechanical structure for connection, the flexible connecting device ensures that the connection between the two split bodies is simple but has a high degree of freedom, and the movement of the second split body 2 is not restricted by rigidity. At the same time, the flexible rope 5 has the advantages of light weight, small volume and ease of storage. This design can greatly reduce the weight of the machine capable of moving on an inclined plane, so that another advantage is that the machine capable of moving on an inclined plane can climb on the inclined plane P with a relatively small adsorption force, which greatly reduces the overall power.

Embodiment 2

Figure 3:
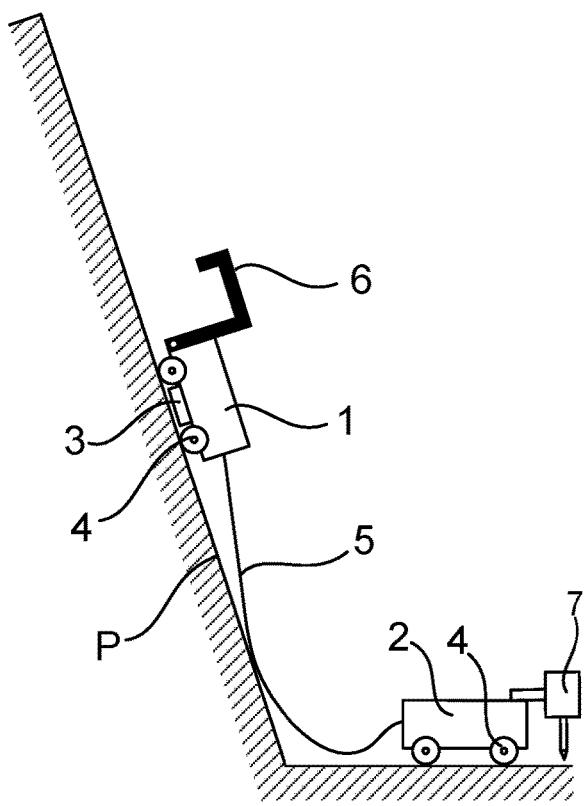
FIG. 3 and FIG. 4 are schematic plan views of a structural principle of Embodiment 2 of a machine capable of moving on an inclined plane according to the present disclosure.
Figure 4:
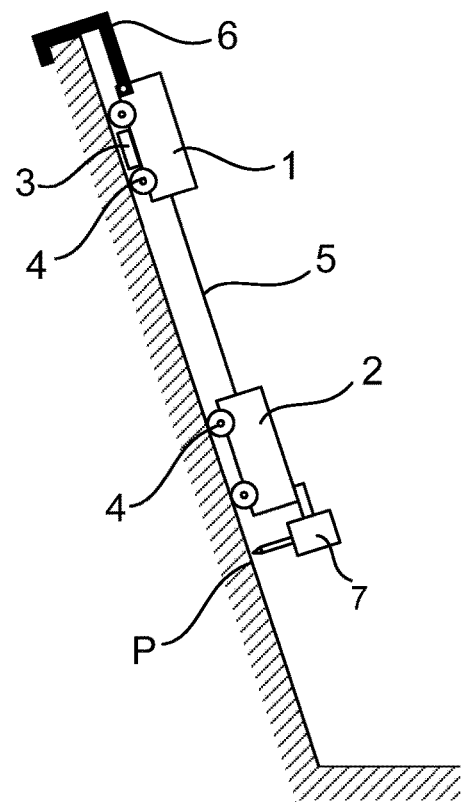

Referring to FIG. 3 and FIG. 4 at the same time, Embodiment 2 of a structure of the machine capable of moving on an inclined plane and a use method therefor according to the present disclosure is provided.

In this embodiment, a moving mechanism 4 and a surface attachment device 3 are installed on a first split body 1. A moving mechanism 4 and operating tools 7 are installed on a second split body 2. The moving mechanism 4 arranged on the first split body 1 includes a driving wheel with a driving capability, and the moving mechanism 4 arranged on the second split body 2 may be a driven wheel without a driving capability or a driving wheel with a driving capability. The suspension mechanism includes a rotating hook 6, and the hook 6 hooks an upper edge of an inclined plane P and forms a connection relationship with the inclined plane P.

Other structures and functions are the same as those in Embodiment 1, and will not be described again.

The present disclosure further discloses a use method for a second machine capable of moving on an inclined plane, which uses the second machine capable of moving on an inclined plane described above and includes the following steps.

Step 21: Start a surface attachment device 3 and a moving mechanism 4 that are installed on a first split body 1 to drive the first split body 1 and the functional components installed on the first split body 1 to move on an inclined plane P, where a second split body 2 and the functional components installed on the second split body 2 are positioned below the inclined plane P; and unwind a rope by a rope winding mechanism, so that the rope 5 is in a relaxed state without tension.

Step 22: After the first split body 1 moves to a designated position of the inclined plane (a position that facilitates the hooking of the hook 6 of the suspension mechanism, such as a protrusion, a step and a shackle on the inclined plane P, and in this embodiment, the designated position is an upper edge of the inclined plane P), enable the hook 6 of the suspension mechanism to rotate and hook the upper edge of the inclined plane P, so that the hook 6 and the inclined plane P form a connection relationship. Then shut down the surface attachment device 3 on the first split body 1.

Step 23: Wind the rope by the rope winding mechanism, so that the rope 5 is in a tensioned state. The rope 5 applies tension on the second split body 2 to balance the gravity of the second split body 2 and the functional components installed on the second split body 2, pull the second split body 2 to move on the inclined plane P and implement operations. In this case, even if the surface attachment device 3 is not installed on the second split body 2, the second split body 2 can be safely hung on the inclined plane P without falling. In this embodiment, the operating tool 7 is a drilling machine, and the drilling machine will generate an operation reaction force during drilling. Therefore, the surface attachment device 3 is installed on the second split body 2, and its function is to generate an adsorption force to balance the operation reaction force. When the drilling operation is performed, the surface attachment device 3 on the second split body 2 is started to generate an operation reaction force against the drilling. When the drilling operation is not performed, the surface attachment device 3 on the second split body 2 is shut down to reduce energy consumption and protect the surface attachment device 3.

Step 24: When this round of operations is completed, enable the second split body 2 and the functional components installed on the second split body 2 to move to below the inclined plane P, and then unwind the rope by the rope winding mechanism to make the rope 5 in a relaxed state without tension, so that the rope 5 no longer applies tension on the first split body 1. Start the surface attachment device 3 and the moving mechanism 4 that are installed on the first split body 1 to move on the inclined plane P, enable the hook 6 of the first split body 1 to rotate and be separated from the upper edge of the inclined plane P; and enable the first split body 1 and the functional components installed on the first split body 1 to move on the inclined plane P.

Step 25: Repeat steps 22 to 24 to continue a next round of operations.

step 26: Enable the first split body 1 and the functional components installed on the first split body 1 to move to below the inclined plane P, and end the operations of a machine capable of moving on an inclined plane on the inclined plane.

Compared with Embodiment 1, the machine capable of moving on an inclined plane of this embodiment further has one advantage. When the operating tools 7 are heavy, the second split body 2 of Embodiment 1 cannot climb up the inclined plane P with the operating tools 7. However, in this embodiment, the first split body 1 is first enabled to climb on the inclined plane P to place the suspension mechanism, and then the second split body 2 and the operating tools 7 thereof are pulled through the flexible connecting device provided on the first split body 1. This can effectively improve the load-bearing capacity and operating capacity of the machine capable of moving on an inclined plane.

In Embodiment 1 and Embodiment 2, the suspension mechanism is a rotating hook 6. The suspension mechanism may have another structure. For example, the suspension mechanism is a lantern ring, which can sleeve a protruding structure on the inclined plane P. The suspension mechanism may alternatively be a mechanism with adsorption capability, such as a magnet or a vacuum chuck, and the suspension mechanism is configured to connect the inclined plane by adsorption. Although the magnet or the vacuum chuck of the suspension mechanism must always maintain an adsorbed state, the adsorbed position is always fixed, i.e., the magnet or the vacuum chuck does not need to move in a large range on the inclined plane P, thereby protecting the magnet or the vacuum chuck from wear on the inclined plane P and reducing the amount of dust and foreign matter (such as dust and scrap iron on the inclined plane P). This is beneficial to protecting the magnet or the vacuum chuck.

Embodiment 3

Figure 5:
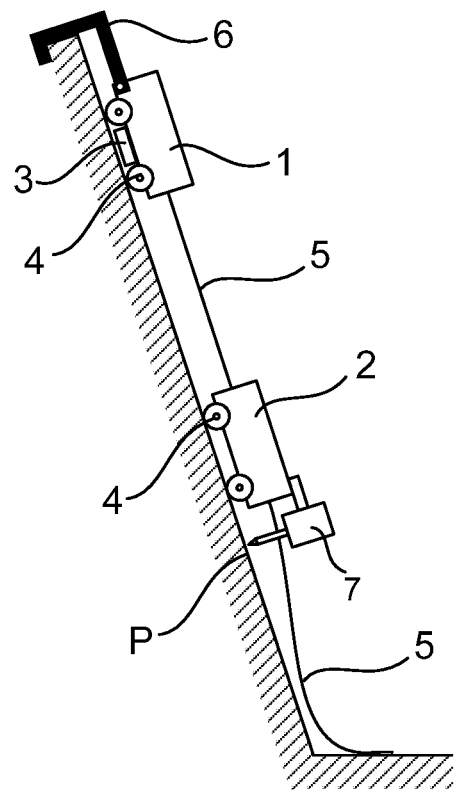
FIG. 5 and FIG. 6 are schematic plan views of a structural principle of Embodiment 3 of a machine capable of moving on an inclined plane according to the present disclosure.
Figure 6:
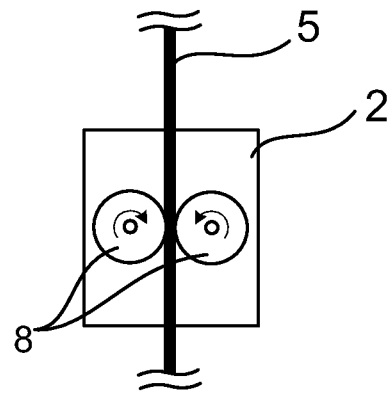

This embodiment is another implementation solution of Embodiment 2. As shown in FIG. 5, the rope driving mechanism is a rope climbing mechanism (not shown in the figure) that can move along the rope 5. Many mechanisms can achieve the function of moving along the rope. For example, as shown in FIG. 6, the rope climbing mechanism includes two rope clamping wheels 8 installed on the second split body 2. The two rope clamping wheels 8 clamp the rope 5, and the two rope clamping wheels 8 rotate in the direction shown in FIG. 6, so that the second split body 2 can move upward along the rope 5. The two rope clamping wheels 8 rotate in opposite directions, and the second split body 2 moves downward along the rope 5.

Other structures and functions are the same as those in Embodiment 2, and will not be described again.

Embodiment 4

Figure 7:
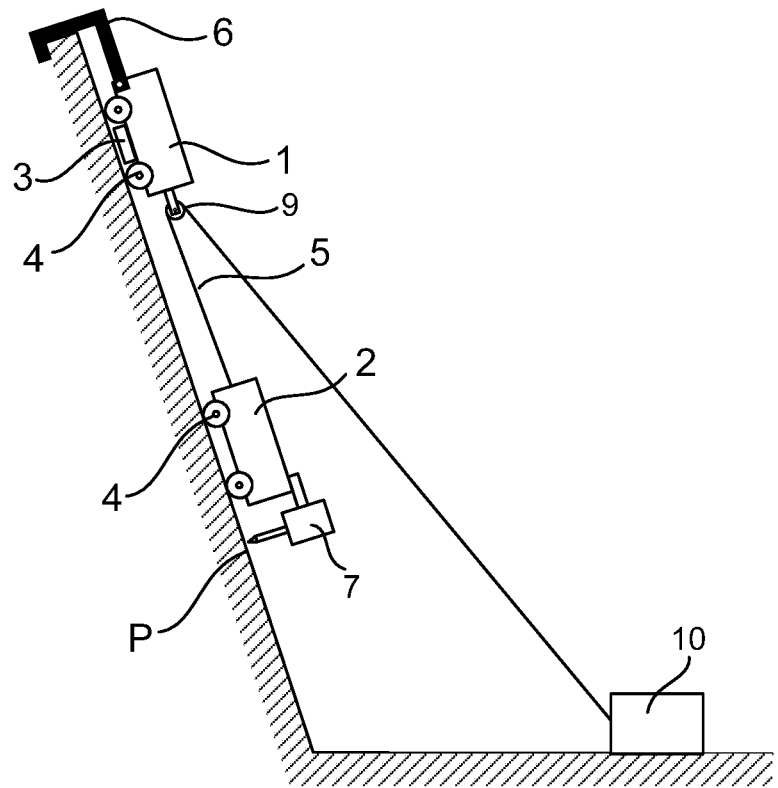
FIG. 7 is a schematic plan view of a structural principle of Embodiment 4 of a machine capable of moving on an inclined plane according to the present disclosure.

This embodiment is another implementation solution of Embodiment 2. As shown in FIG. 7, the rope winding mechanism is arranged below the inclined plane P. The first split body 1 is provided with a pulley 9. The rope 5 runs through the pulley 9 and is connected to the rope winding mechanism 10 and the second split body 2. The rope winding mechanism 10 winds or unwinds the rope 5 to change the distance between the first split body 1 and the second split body 2, and at the same time, tension is applied to the second split body 2 to drive the second split body 2 to move on the inclined plane P. Compared with Embodiment 2, this embodiment has the advantages that the rope winding mechanism 10 is not installed on the second split body 2, which further reduces the weight of the second split body 2 and helps reduce labor intensity of workers when carrying and recycling the second split body 2.

Other structures and functions are the same as those in Embodiment 2, and will not be described again.

Embodiment 5

Figure 8:
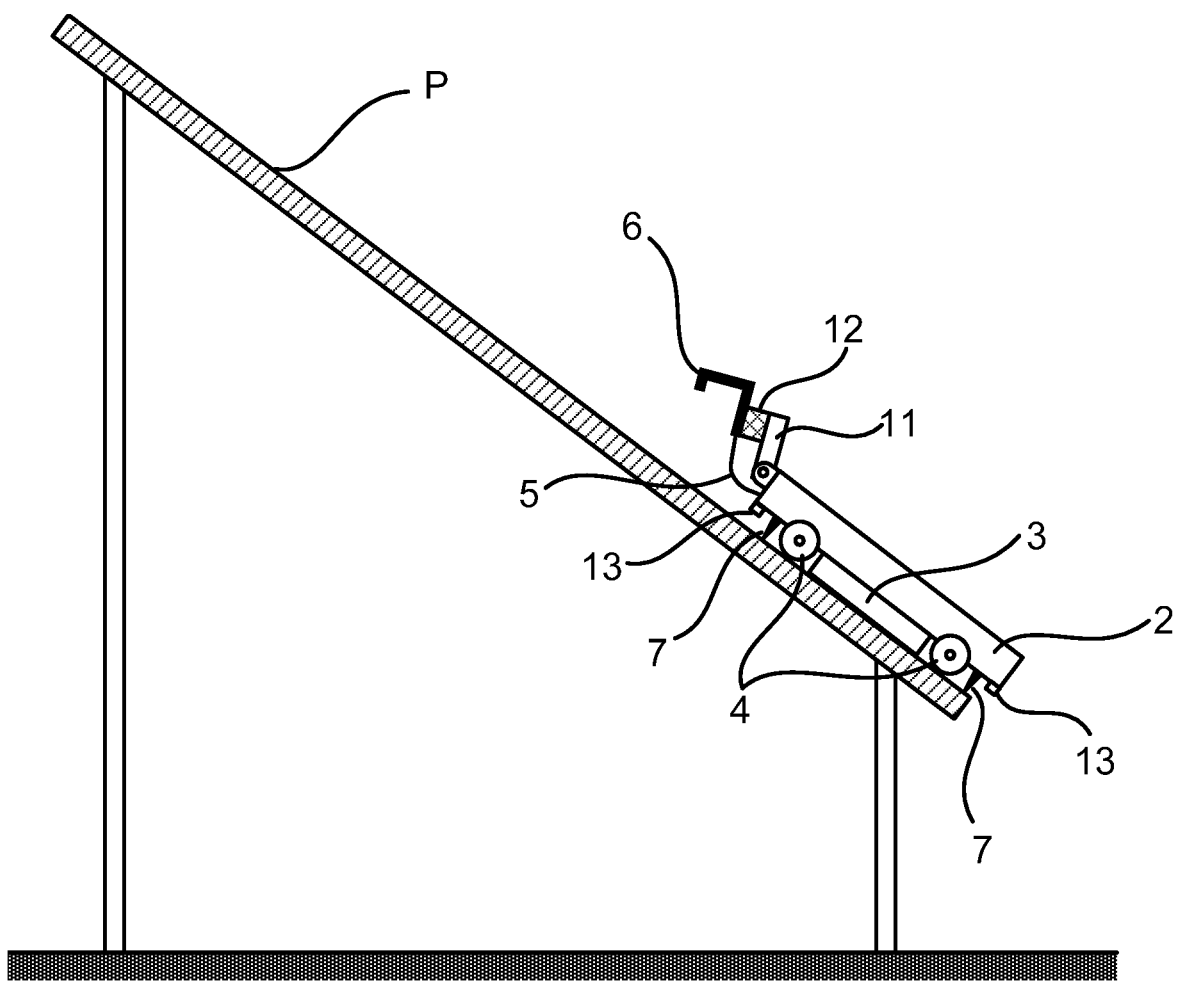
FIG. 8, FIG. 9 and FIG. 10 are schematic plan views of a structural principle of Embodiment 5 of a machine capable of moving on an inclined plane according to the present disclosure.
Figure 9:
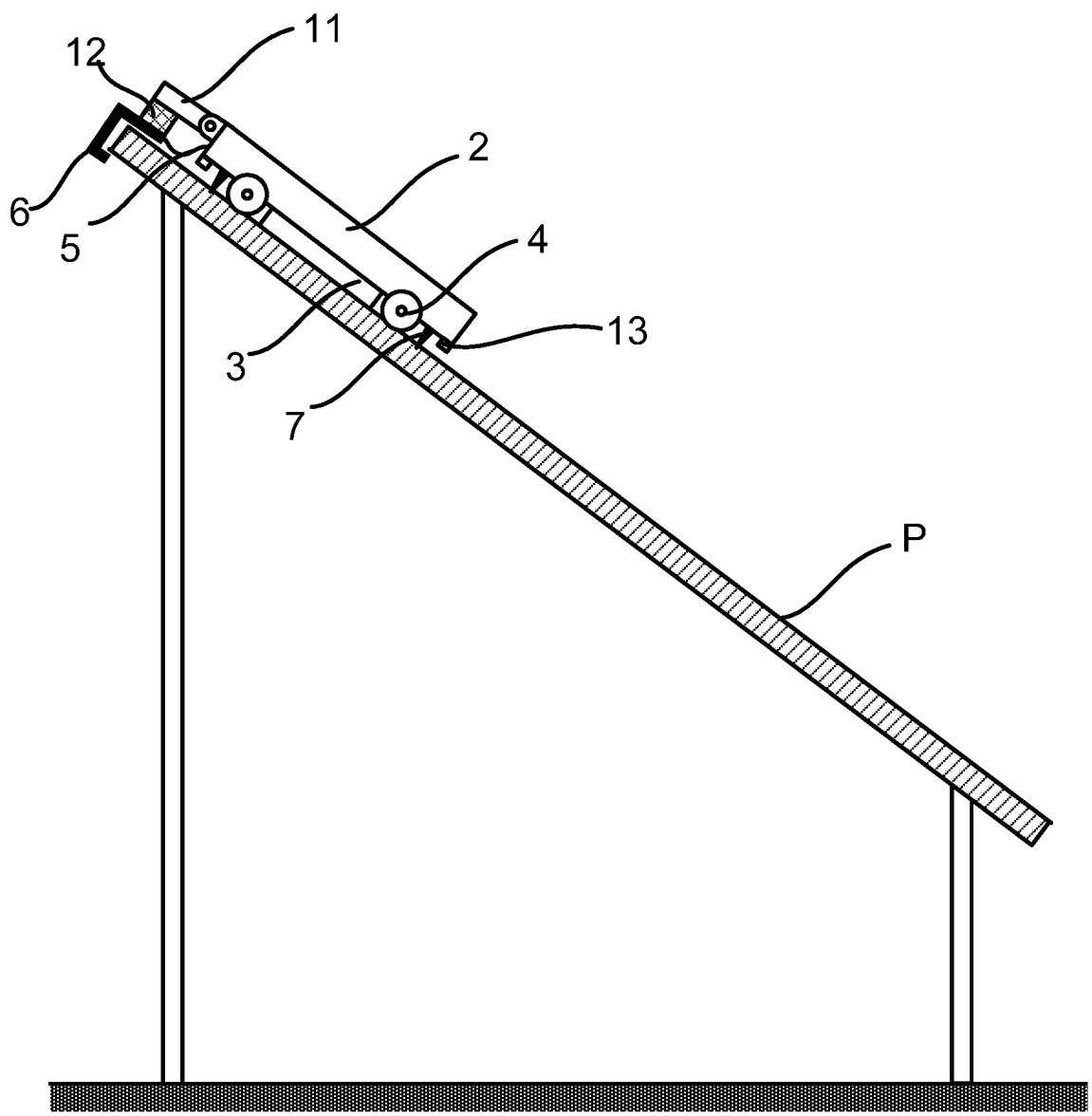
Figure 10:
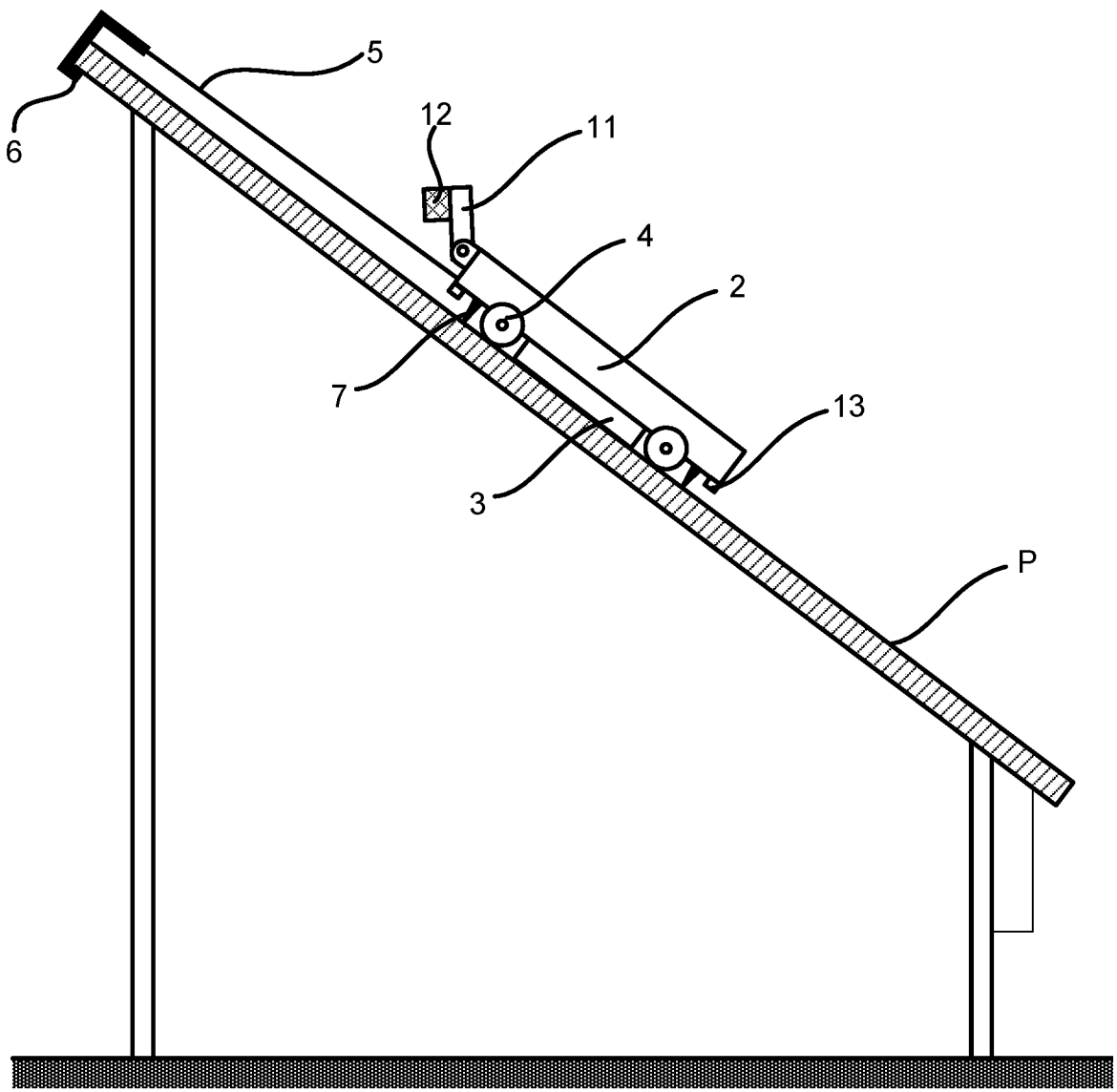

Referring to FIG. 8, FIG. 9 and FIG. 10 at the same time, Embodiment 5 of a structure of the machine capable of moving on an inclined plane and a use method therefor according to the present disclosure is provided.

In this embodiment, the cleaning operation of an obliquely arranged photovoltaic module array is taken as an example to describe the present disclosure in more detail. A photovoltaic power station is built in a field environment. The photovoltaic power station is composed of a large number of photovoltaic module arrays, and each of the photovoltaic module arrays is composed of 10-20 photovoltaic panels. The photovoltaic module arrays are not connected to each other, and a road that is 1-3 meters wide is usually provided between the photovoltaic module arrays. Dust falling on the photovoltaic module array blocks effective irradiation of sunlight, which will seriously affect photoelectric conversion efficiency. In addition, because of uneven illumination, local overheating may further be caused, resulting in generation of hot spots, which will damage the photovoltaic modules. A lot of dust is present in the air. Even if shortly after cleaning, the photovoltaic modules will accumulate dust. Therefore, it is very necessary to clean photovoltaic modules frequently.

At present, the cleaning operations in photovoltaic power stations are still performed mainly by manual labor. However, because of many disadvantages of manual cleaning (such as high labor cost, low cleaning efficiency, unstable cleaning quality and ease of damage to a power generation board), cleaning by robots began to gradually replace manual cleaning. The patent application No. CN201711115056.1 discloses a cleaning machine for a photovoltaic module array. The cleaning machine includes an operating machine, a longitudinal walking track and a horizontal walking track. The operating machine is arranged on the longitudinal walking track, and the longitudinal walking track is arranged on the photovoltaic module array through the horizontal walking track. Through the longitudinal walking track and the horizontal walking track, the operating machine moves on a surface of the photovoltaic module array and performs operations such as cleaning and inspection. The patented technology has the following problems:

(1) The longitudinal walking track and the horizontal walking track make the whole device bulky and heavy, which leads to heavy and complicated installation and disassembly work.

(2) Hundreds of photovoltaic module arrays are provided in a photovoltaic power station. If each photovoltaic module array is provided with one cleaning machine of the disclosure, hundreds of cleaning devices need to be installed for one photovoltaic power station, so that an initial investment cost is extremely high, and the later operation and maintenance cost is also very high. To reduce the number of cleaning devices, the cleaning device may be manually carried from one photovoltaic module array to a next photovoltaic module array to increase the reuse rate of the cleaning device, so as to reduce the number of the cleaning machines. However, because the cleaning machines are bulky and heavy, the installation and disassembly work is heavy and complicated, and it takes a long time.

The patent No. CN201810900530.X discloses a cleaning robot for a photovoltaic module array. A surface attachment device of the cleaning robot generates negative pressure, so that the robot can be adsorbed on surfaces of the photovoltaic modules to move and perform cleaning operations. Because the surface attachment device is always in an operating state, energy consumption is very high, and a large-capacity battery is required to maintain long-term operations. To carry a large-capacity battery, it is necessary to configure a battery truck on the ground, and the battery moves along with the cleaning robot, and supplies power to the cleaning robot through a cable. Moreover, If the surface attachment device operates for a long time, dust and foreign matter on the surfaces of the photovoltaic modules will be sucked in, which will cause damage to a vacuum pump and blockage of a vacuum pipeline.

This embodiment provides a machine capable of moving on an inclined plane, which has lower energy consumption and a lighter weight, is safer for cleaning a photovoltaic module array, and is referred to as a cleaning mobile machine in this embodiment. The cleaning mobile machine includes a first split body 1, a second split body 2 and functional components. The functional components include a surface attachment device 3, a moving mechanism 4, a rope 5 of a flexible connecting device and a rope winding mechanism (not shown in the figure) for winding or unwinding the rope 5. The first split body 1 is a hook 6. The surface attachment device 3 is a vacuum chuck, which can generate negative pressure to be attached to surfaces of photovoltaic modules and is installed on the second split body 2. The moving mechanism 4 is also installed on the second split body 2 and is a plurality of omnidirectional driving wheels, so that the cleaning machine can move horizontally and longitudinally on an inclined plane P of the photovoltaic module array. The first split body 1 and the second split body 2 may be combined with each other into a whole through a split connection mechanism, or may be separated from each other. The split connection mechanism includes an oscillating rod 11 and a magnet 12. The oscillating rod 11 is installed at a front end of the second split body 2, and the magnet 12 is installed at a front end of the oscillating rod 11. The magnet 12 can attract the hook 6. The rope 5 connects the first split body 1 to the second split body 2. The rope winding mechanism (not shown in the figure) is installed on the second split body 2. One end of the rope 5 is fixed to the hook 6, and the other end thereof is connected to the rope winding mechanism. The rope winding mechanism changes the length of the rope 5 and generates tension by winding or unwinding the rope. The second split body 2 is further provided with an operating tool 7, which is a soft dust scraping strip for cleaning operations. The moving mechanism 4 drives the second split body 2 to move, and then drives the soft dust scraping strip to move, which can remove dust on the surfaces of the photovoltaic modules. The operating tool 7 may alternatively be another tool, such as a rotating hair brush. The second split body 2 is further provided with several edge detection sensors 13 configured to detect an edge of the photovoltaic module array. The cleaning mobile machine is further provided with an alarm (not shown in the figure) configured to prompt a state of the cleaning mobile machine.

The present disclosure further discloses a use process of the cleaning mobile machine, including the following steps.

Step 31: A magnet 12 at a front end of an oscillating rod 11 attracts a hook 6, i.e., a first split body 1 and a second split body 2 are combined into a whole through a split connection mechanism, and a worker places the cleaning mobile machine on an inclined plane P of a photovoltaic module array. Start a vacuum chuck and omnidirectional driving wheels installed on the second split body 2. The vacuum chuck provides an adsorption force to adsorb the inclined plane P, and the adsorption force enables friction to be generated between the omnidirectional driving wheels and the inclined plane P. The friction overcomes gravity and drives the cleaning mobile machine to move on the inclined plane P of the photovoltaic module array.

Step 32: When the cleaning mobile machine moves to an upper edge of the inclined plane P, edge detection sensors 13 detect the edge, and the moving mechanism stops. The oscillating rod 11 oscillates downward to put down the hook 6, the cleaning mobile machine moves vertically downward, the hook 6 hooks the upper edge of the photovoltaic module array, and the vacuum chuck stops operating, as shown in FIG. 9.

Step 33: The oscillating rod 11 oscillates upward, so that the magnet 12 is separated from the hook 6, i.e., the second split body 2 is separated from the first split body 1. The second split body 2 longitudinally moves on the inclined plane P by the extension and shortening of the rope 5. The rope 5 is in a tensioned state, and applies tension to the second split body 2, and the tension balances the gravity of the second split body 2 and the functional components installed on the second split body 2. In this case, the surface attachment device 3 is shut down. During the movement of the second split body 2, the operating tool 7 starts the cleaning operation, as shown in FIG. 10. The moving mechanism 4 of the second split body 2 can also horizontally move. The hook 6 is pulled by the rope 5 to move horizontally to change the hung position, so that movement and cleaning operation can be performed on the entire inclined plane P. The edge detection sensors 13 of the second split body 2 can detect the edge of the photovoltaic module array to ensure that the cleaning mobile machine will not fall from the inclined plane P.

Step 34: When this cleaning operation is completed, the second split body 2 moves upward to the vicinity of the hook 6, the oscillating rod 11 oscillates downward, and the magnet 12 attracts the hook 6, i.e., the first split body 1 and the second split body 2 are combined to be a whole. The vacuum chuck and the omnidirectional driving wheels are started, then the cleaning mobile machine moves upward by a distance to make the hook 6 leave the upper edge of the inclined plane P, and then the hook 6 is rotated to be completely separated from the upper edge of the inclined plane P. The cleaning mobile machine moves on the inclined plane P.

Step 35: Repeat steps 32 to 34 to continue to perform cleaning operations at other positions of the inclined plane of the photovoltaic module array or on other photovoltaic module arrays.

Step 36: The cleaning mobile machine moves to below the inclined plane P, the operation of the cleaning mobile machine on the inclined plane is ended, and the worker recycles the cleaning mobile machine.

Compared with an existing cleaning machine for a photovoltaic module array, the cleaning mobile machine of this embodiment has the following advantages:

(1) The hook 6 forms a relationship of reliable fixed connection with the upper edge of the photovoltaic module array. Even if the cleaning mobile machine fails (such as a failure of the vacuum chuck, a failure of the omnidirectional driving wheels, a failure of a control program and a failure of the operating tools), the cleaning mobile machine can still be safely hung on the photovoltaic module array without falling.

(2) The vacuum chuck is started only during the process of placing the hook 6 and recycling the hook 6 by the cleaning mobile machine. During the cleaning operation of the cleaning mobile machine, the vacuum chuck is in a state of stopped operation, and the working time of the vacuum chuck is greatly shortened, which greatly reduces the overall energy consumption, so that the cleaning mobile machine can operate for a long time without a large-capacity and heavy-weight battery. Moreover, the probability of failure of the vacuum chuck 3 is greatly reduced, and the service life is also greatly prolonged.

(3) The rope 5 is used instead of the longitudinal walking track. The weight of the rope 5 is almost zero, and the rope 5 occupies an extremely small space when wound around the rope winding mechanism. This makes the cleaning mobile machine light in weight and small in size, and facilitates manual carrying and operation. Also because of the light weight and small size, the omnidirectional driving wheels can drive the cleaning mobile machine to move horizontally.

(4) The cleaning mobile machine can complete the placement and recycling of the hook 6. An operator only needs to perform simple operations of placing and carrying the machine on the ground, which greatly reduces the operator's operating time, operating intensity and difficulty.

(5) Because placing and carrying cleaning mobile machines requires a short time and low intensity, one worker can manage multiple cleaning mobile machines at the same time. When multiple cleaning mobile machines are performing operations on different photovoltaic module arrays, one cleaning mobile machine that has completed the operation sends a signal to the worker, and the worker comes to the position where the cleaning mobile machine is located based on the signal prompt, moves the cleaning machine to the next photovoltaic module array and starts the cleaning mobile machine, and then the worker can leave. Therefore, one worker can have enough time and physical strength to manage multiple cleaning mobile machines at the same time.

Embodiment 6

Figure 11:
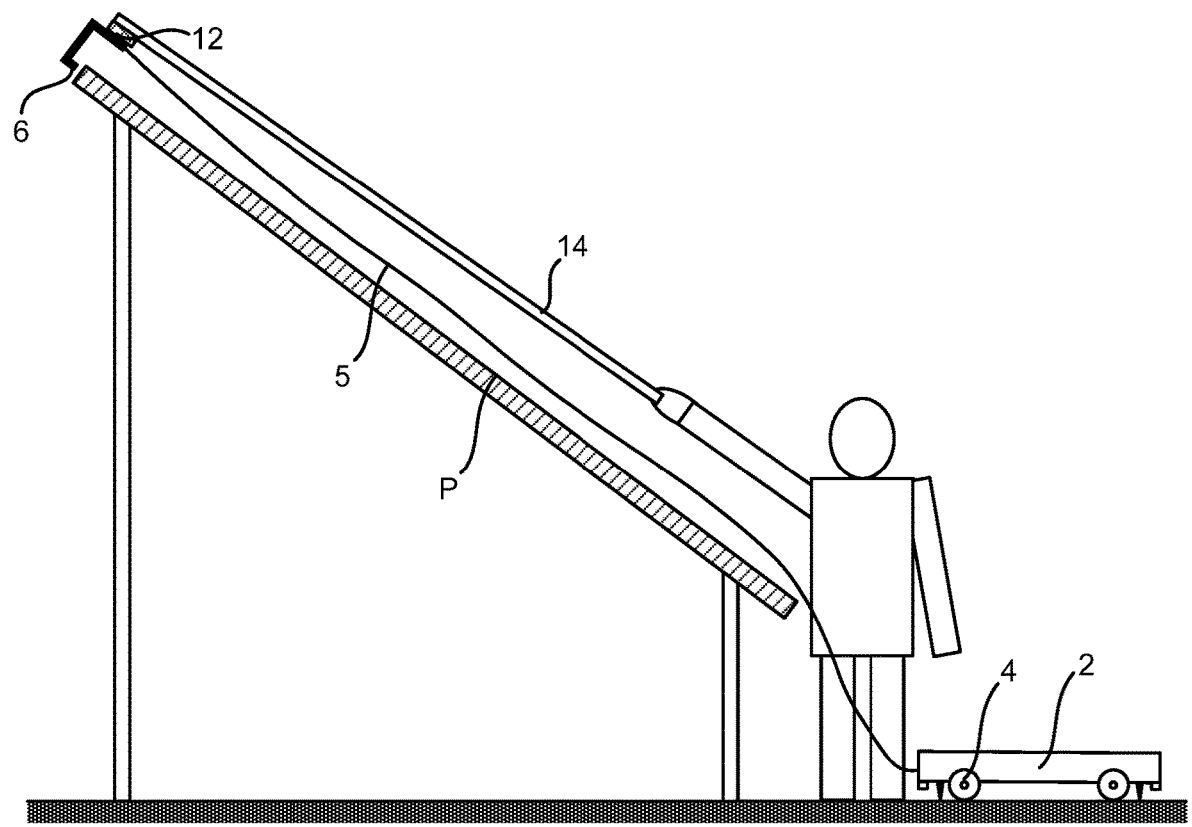
FIG. 11 and FIG. 12 are schematic plan views of a structural principle of Embodiment 6 of a machine capable of moving on an inclined plane according to the present disclosure.
Figure 12:
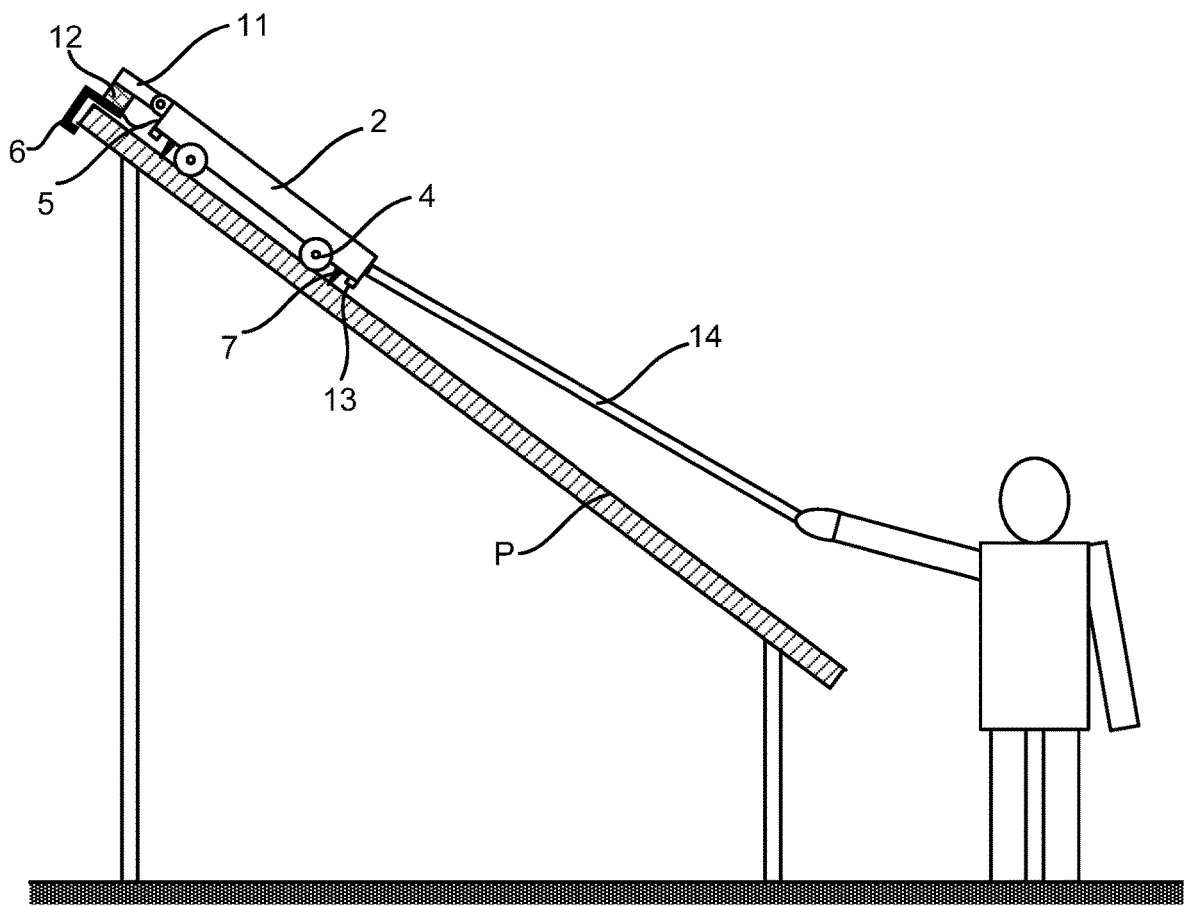
Figure 13:
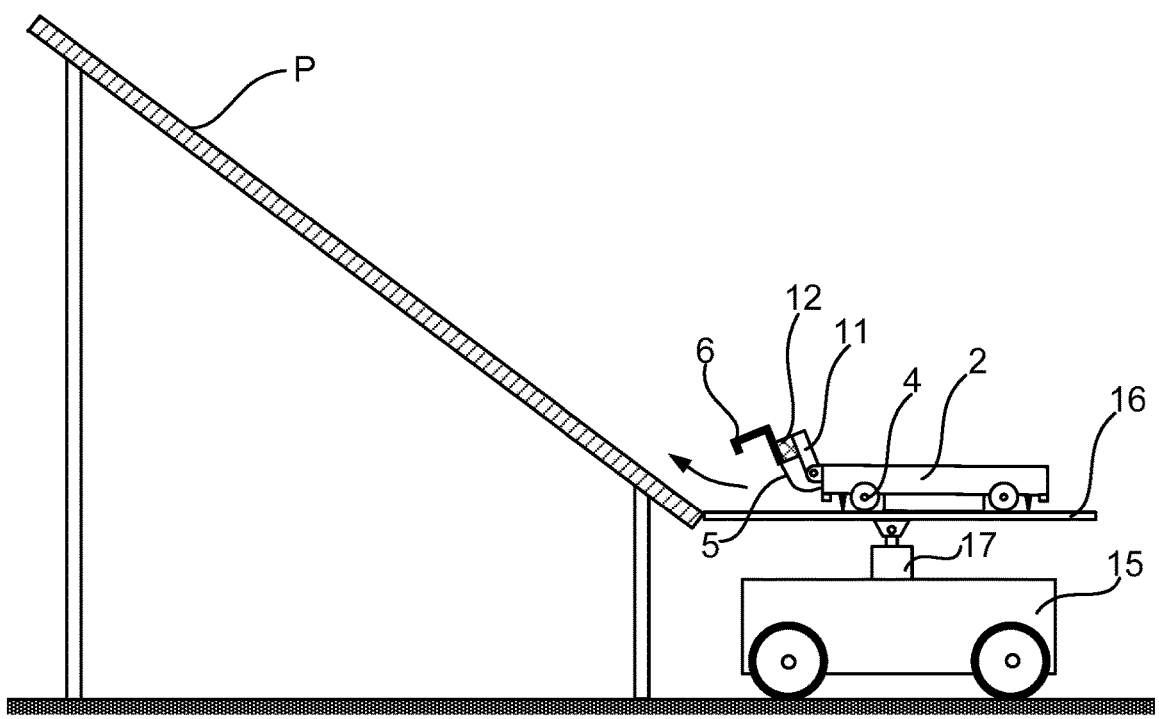
FIG. 13 and FIG. 14 are schematic plan views of a structural principle of Embodiment 7 of a machine capable of moving on an inclined plane according to the present disclosure.
Figure 14:
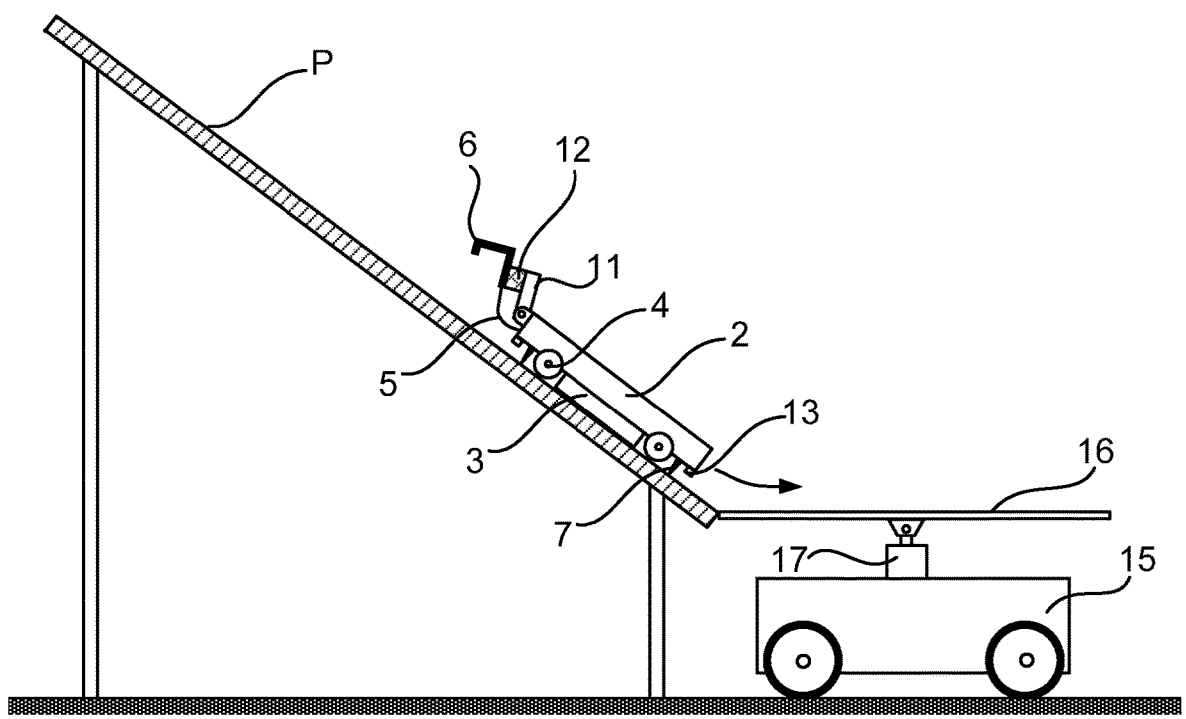

Referring to FIG. 11 and FIG. 12 at the same time, Embodiment 6 of a structure of the machine capable of moving on an inclined plane and a use method therefor according to the present disclosure is provided. The structure of the machine capable of moving on an inclined plane in this embodiment is different from that of Embodiment 5 in that, in this embodiment, the connection and disconnection between the first split body 1 and the inclined plane P is performed by workers.

Still taking the cleaning of the inclined plane of the photovoltaic module array as an example, the use process of the cleaning mobile machine includes the following steps.

Step 41: A worker carries the cleaning mobile machine to a designated position of an inclined plane P for operation.

Step 42: As shown in FIG. 11, the worker uses a long rod 14, a magnet 12 is installed at one end of the long rod 14, and the magnet 12 attracts the hook 6. The worker uses the long rod 14 to move the hook 6 to the upper edge of the photovoltaic module array and put down the hook, so that the hook 6 hooks the upper edge of the photovoltaic module array. When the worker connects the hook 6 to the inclined plane P, the second split body 2 and the functional components installed on the second split body 2 are placed below the inclined plane P, and the rope winding mechanism unwinds the rope to ensure that the rope 5 is always in a relaxed state.

Step 43: The rope winding mechanism tightens the rope 5, and the second split body 2 longitudinally moves on the inclined plane P by the extension and shortening of the rope 5. The rope 5 is in a tensioned state, and applies tension to the second split body 2, and the tension balances the gravity of the second split body 2 and the functional components installed on the second split body 2. During the movement of the second split body 2, the operating tool 7 starts the cleaning operation. The moving mechanism of the second split body 2 can also horizontally move. The hook is pulled by the rope 5 to move horizontally to change the hung position, so that movement and cleaning operation can be performed on the entire inclined plane P. The edge detection sensors 13 of the second split body 2 can detect the edge of the photovoltaic module array to ensure that the cleaning mobile machine will not fall from the inclined plane.

Step 44: After this cleaning operation is completed, the worker places the second split body 2 and the functional components installed on the second split body 2 below the inclined plane P, and then uses the long rod 14 to attract the hook 6 and removes the hook 6 from the upper edge of the inclined plane P.

Step 45: The worker carries the cleaning mobile machine to other positions of the inclined plane P, repeats steps 42 to 44, and performs a next round of cleaning operations until the operations on all inclined planes are completed.

FIG. 12 is another operation method for a worker to place a hook 6. A magnet 12 at a front end of an oscillating rod 11 attracts the hook 6, i.e., a first split body 1 and a second split body 2 are combined into a whole through a split connection mechanism, and the worker places the cleaning mobile machine on an inclined plane P of a photovoltaic module array. Then, the worker uses a long rod 14 to abut against the cleaning mobile machine and push the cleaning mobile machine to move upward along the inclined plane P. When the cleaning mobile machine moves to the upper edge of the inclined plane P, the oscillating rod 11 oscillates downward to place down the hook 6, and the hook 6 is connected to the inclined plane P. After this cleaning operation is completed, the worker again uses the long rod 14 to abut against the cleaning mobile machine, the oscillating rod 11 oscillates downward, so that the magnet 12 attracts the hook 6, and then the oscillating rod 11 oscillates upward, and the hook 6 is separated from the upper edge of the inclined plane P. The cleaning mobile machine moves downward, and the worker recycles the cleaning mobile machine and carries the cleaning mobile machine to the inclined plane of the next photovoltaic module array.

In Embodiment 1 to Embodiment 5 and Embodiment 7 described below, the process of connection and disconnection between the suspension mechanism of the first split body 1 and the inclined plane P is performed without external intervention from a worker. However, in this embodiment, the connection and disconnection between the suspension mechanism of the first split body 1 and the inclined plane P is performed with the assistance of a worker. A long rod is manually used to assist in connection and disconnection between the hook 6 and the upper edge of the inclined plane P. There are many methods of manual assistance. For example, a worker stands on an inversely V-shaped ladder and connects the hook 6 to the inclined plane P. The methods are no longer listed one by one herein.

Compared with the embodiment without external interference from a worker, the manual assistance method of this embodiment has the following advantages:

(1) It is not necessary to install a surface attachment device for the cleaning mobile machine. Because the worker uses the long rod 14 to implement connection and disconnection between the hook 6 and the upper edge of the inclined plane P, the cleaning mobile machine moves on the inclined plane P without relying on the adsorption force. This is conducive to further reducing the weight, power consumption and cost of the cleaning mobile machine.

(2) The manual assistance method can enhance the operating capability of the cleaning mobile machine. For example, to clean out stubborn stains on the photovoltaic module array, operating tools need to include a water tank, a water sprayer and a high-power hair brush. The water sprayer sprays water from the water tank on surfaces of photovoltaic modules to moisten the stubborn stains, and the hair brush rotates at a high speed to remove the stains, so that the stains are washed away with the water flow. The water tank, the water sprayer and the high-power hair brush will greatly increase the weight of the cleaning mobile machine. At the same time, the slippery surface makes wheels slip. This will make the cleaning mobile machine unable to move on the inclined photovoltaic module array, and thus it is impossible to complete the action of placing the hook 6 by moving to the upper edge of the photovoltaic module array like in Embodiment 5. Then, placing the hook 6 by means of manual assistance can solve these problems well.

Embodiment 7

Referring to FIG. 8, FIG. 9, FIG. 10, FIG. 13 and FIG. 14 at the same time, Embodiment 7 of a structure of the machine capable of moving on an inclined plane and a use method therefor according to the present disclosure is provided. The direction indicated by the arrow in the figure is the moving direction of the cleaning mobile machine.

In the embodiment described above, an operator completes operations of carrying and placing the cleaning mobile machine. This embodiment further proposes a solution that does not require manual participation.

This embodiment differs from Embodiment 5 and Embodiment 6 in that a multi-robot system of this embodiment includes a cleaning mobile machine and a carrying machine. The carrying machine includes a mobile machine body and a machine docking mechanism. A mobile machine can move in space, and is, for example, an unmanned aerial vehicle flying in the air, a vehicle body moving on the ground, or a hull floating in water. The machine docking mechanism is installed on the mobile machine body, and the machine capable of moving on an inclined plane and the carrying machine can be combined and separated by the machine docking mechanism. In this embodiment, the mobile machine body is a trolley 15 that can move on the ground. The docking mechanism includes a bridge plate 16 and a bridge plate adjustment mechanism 17. The bridge plate adjustment mechanism 17 is installed on the trolley 15, and the bridge plate 16 is installed on the bridge plate adjustment mechanism 17. The bridge plate adjustment mechanism 17 can adjust a position and posture of the bridge plate 16.

Other structures and functions are the same as those in Embodiment 5 and Embodiment 6, and will not be described again.

A use method for the machine capable of moving on an inclined plane (i.e., the cleaning mobile machine) in this embodiment includes the following steps.

Step 51: The cleaning mobile machine is placed on the bridge plate 16 of the carrying machine, and the carrying machine conveys the cleaning mobile machine to a designated photovoltaic module array.

Step 52: The bridge plate adjustment mechanism 17 of the carrying machine adjusts the position and posture of the bridge plate 16, so that the bridge plate 16 is close to and aligned with a lower edge of the inclined plane P of the photovoltaic module array. The cleaning mobile machine moves from the bridge plate 16 to the inclined plane P; at the same time, the vacuum chuck of the cleaning mobile machine is started, and then the cleaning mobile machine moves on the inclined plane P.

Step 53: When the cleaning mobile machine moves to an upper edge of the inclined plane P, edge detection sensors 13 detect the edge, and the moving mechanism 4 stops. The oscillating rod 11 oscillates downward to put down the hook 6, the cleaning mobile machine moves vertically downward, the hook 6 hooks the upper edge of the photovoltaic module array, and the vacuum chuck stops operating, as shown in FIG. 9.

Step 54: The oscillating rod 11 oscillates upward, so that the magnet 12 is separated from the hook 6, i.e., the second split body 2 is separated from the first split body 1. The second split body 2 longitudinally moves on the inclined plane P by the extension and shortening of the rope 5. The rope 5 is in a tensioned state, and applies tension to the second split body 2, and the tension balances the gravity of the second split body 2 and the functional components installed on the second split body 2. In this case, the surface attachment device 3 is shut down. During the movement of the second split body 2, the operating tool 7 starts the cleaning operation, as shown in FIG. 10. The moving mechanism 4 of the second split body 2 can also horizontally move. The hook 6 is pulled by the rope 5 to move horizontally to change the hung position, so that planar movement and cleaning operation can be performed on the inclined plane P. The edge detection sensors 13 of the second split body 2 can detect the edge of the photovoltaic module array to ensure that the cleaning mobile machine will not fall from the inclined plane.

Step 55: When this cleaning operation is completed, the second split body 2 moves upward to the vicinity of the hook 6, the oscillating rod 11 oscillates downward, and the magnet 12 attracts the hook 6, i.e., the first split body 1 and the second split body 2 are combined to be a whole. The vacuum chuck and the omnidirectional driving wheels are started, then the cleaning mobile machine moves upward by a distance to make the hook 6 leave the upper edge of the inclined plane P, and then the hook 6 is rotated to be completely separated from the upper edge of the inclined plane P. The cleaning mobile machine moves on the inclined plane P.

Step 56: Repeat steps 53 to 55 to perform the next round of cleaning operations at different positions of the inclined plane P. Or the cleaning mobile robot sends an instruction signal to the carrying machine. After receiving the instruction signal, the carrying machine moves to below the inclined plane P where the cleaning mobile robot is located under the guidance of a satellite positioning system. The bridge plate adjustment mechanism 17 of the carrying machine adjusts the position and posture of the bridge plate 16, so that the bridge plate 16 is close to and aligned with a lower edge of the inclined plane P of the photovoltaic module array. The cleaning mobile machine moves from the inclined plane P to the bridge plate 16, and then the vacuum chuck is shut down; and then steps 52 to 55 are repeated to perform the next round of cleaning operations on the inclined plane P of another photovoltaic module array until the operations on all inclined planes are completed.

Compared with Embodiment 5 and Embodiment 6, the cleaning mobile machine of this embodiment has the following advantages.

(1) The automatic cleaning of photovoltaic power stations is implemented without the participation of workers.

(2) A cruise trolley 15 does not need to participate in the cleaning process of a cleaning mobile machine, and no connection cable is available between the cruise trolley 15 and the cleaning mobile machine. Therefore, a one-to-many system (i.e., one cruise trolley 15 corresponds to multiple cleaning mobile machines) can be constructed to increase the utilization rate of the cruise trolley 15 and reduce the number of configured cruise trolleys 15. This is conducive to reducing costs and reducing subsequent maintenance work.

The above described are merely one embodiment of the present disclosure, and are not intended to limit the present disclosure. Any modification, equivalent replacement, improvement and the like made within the spirit and principle of the present disclosure shall fall within the protection scope of the present disclosure.

The invention claimed is:

1. A machine capable of moving on an inclined plane, comprising a first split body, a second split body and functional components, wherein the functional components comprise a moving mechanism, a flexible connecting device and operating tools, the operating tools are installed on the first split body and/or the second split body, and configured to perform operations, the flexible connecting device connects the first split body to the second split body, and adjusts a distance between the first split body and the second split body, the moving mechanism is installed on the first split body and/or the second split body and configured to drive the first split body and/or the second split body to move on the inclined plane, the first split body contains a suspension mechanism, and the suspension mechanism is configured to connect or disconnect the inclined plane,
wherein the functional components further comprise a surface attachment device, the surface attachment device installed on the first split body and/or the second split body and configured to be attached to the inclined plane.

2. The machine capable of moving on an inclined plane according to claim 1, further comprising a split connection mechanism installed on the first split body and/or the second split body and configured to connect and disconnect the first split body and the second split body.

3. The machine capable of moving on an inclined plane according to claim 1, wherein the flexible connecting device comprises a rope and a rope driving mechanism, and the rope driving mechanism changes the distance between the first split body and the second split body and tensions or relaxes the rope.

4. The machine capable of moving on an inclined plane according to claim 3, wherein the rope driving mechanism comprises a rope winding mechanism, and the rope winding mechanism changes the length of the rope between the first split body and the second split body by winding the rope, and tensions or relaxes the rope.

5. The machine capable of moving on an inclined plane according to claim 3, wherein the rope driving mechanism comprises a rope climbing mechanism, and the rope climbing mechanism is arranged on the second split body and drives the second split body to move along the rope.

6. The machine capable of moving on an inclined plane according to claim 1, wherein the operating tools are one or more of a camera, a drilling machine, a soft dust scraping strip, and a rotating hair brush.

7. A multi-robot system, comprising a machine capable of moving on an inclined plane, comprising a first split body, a second split body and functional components, wherein the functional components comprise a moving mechanism, a flexible connecting device and operating tools, the operating tools are installed on the first split body and/or the second split body, and configured to perform operations, the flexible connecting device connects the first split body to the second split body, and adjusts a distance between the first split body and the second split body, the moving mechanism is installed on the first split body and/or the second split body and configured to drive the first split body and/or the second split body to move on the inclined plane, the first split body contains a suspension mechanism, and the suspension mechanism is configured to connect or disconnect the inclined plane, and further comprising a carrying machine, wherein the carrying machine comprises a mobile machine body and a machine docking mechanism, the mobile machine body is capable of moving in space, the machine docking mechanism is installed on the mobile machine body, and the machine capable of moving on an inclined plane and the carrying machine are capable of being combined or separated by the machine docking mechanism.

8. The multi-robot system according to claim 7, wherein the mobile machine body is a flying machine that flies in the air, or a vehicle body that moves on the ground, or a hull that floats in water.

9. The multi-robot system according to claim 7, wherein the machine docking mechanism comprises a bridge plate and a bridge plate adjustment mechanism, the bridge plate is installed on the bridge plate adjustment mechanism, and the bridge plate adjustment mechanism is installed on the mobile machine body; the bridge plate adjustment mechanism adjusts a position and posture of the bridge plate, and the machine capable of moving on an inclined plane moves from the inclined plane to the bridge plate and is combined with the carrying machine, or the machine capable of moving on an inclined plane moves from the bridge plate to the inclined plane and is separated from the carrying machine.

10. A use method for the multi-robot system according to claim 7, comprising the following steps:
step v-1: combining a machine capable of moving on an inclined plane with a carrying machine through a machine docking mechanism, and using the carrying machine to convey the machine capable of moving on an inclined plane to the inclined plane for operation;
step v-2: separating the machine capable of moving on an inclined plane from the carrying machine through the machine docking mechanism, and moving the machine capable of moving on an inclined plane on the inclined plane;
step v-3: connecting a suspension mechanism of a first split body to the inclined plane after the first split body moves to one designated position of the inclined plane;
step v-4: adjusting a distance between the first split body and a second split body through a flexible connecting device, enabling the second split body and the functional components installed on the second split body to move on the inclined plane, and meanwhile, enabling operating tools to perform operations;

step v-5: after this round of operations is completed, starting part or all of a surface attachment device and a moving mechanism, separating the suspension mechanism of the first split body from the inclined plane, and moving the machine capable of moving on an inclined plane on the inclined plane; and step v-6: repeating steps v-3 to v-5 to implement the next round of operations at different positions of the inclined plane, or combining the machine capable of moving on an inclined plane with the carrying machine through the machine docking mechanism, using the carrying machine to convey the machine capable of moving on an inclined plane to another inclined plane, repeating steps v-2 to v-5, and implementing the next round of operations on the another inclined plane until the operations on all inclined planes are completed.

\* \* \* \* \*